United States Patent [19]
Greenberg

[11] Patent Number: 5,570,228
[45] Date of Patent: Oct. 29, 1996

[54] FIBER OPTIC ILLUMINATION SYSTEM AND METHOD FOR A HIGH DEFINITION LIGHT MICROSCOPE

[75] Inventor: Gary Greenberg, Los Angeles, Calif.

[73] Assignee: Edge Scientific Instrument Company LLC, Santa Monica, Calif.

[21] Appl. No.: 975,814

[22] Filed: Nov. 13, 1992

Related U.S. Application Data

[63] Continuation-in-part of Ser. No. 688,170, Apr. 19, 1991, Pat. No. 5,345,333.

[51] Int. Cl.$^6$ .................... G02B 21/06; G02B 21/00
[52] U.S. Cl. ................. 359/389; 359/368; 359/385
[58] Field of Search .................... 389/368–372, 389/385–390, 503–506, 591–594; 385/73–75, 88–93

[56] References Cited

U.S. PATENT DOCUMENTS

| | | | |
|---|---|---|---|
| 4,472,023 | 9/1984 | Yamamoto | 359/370 |
| 4,601,551 | 7/1986 | Pettinpell et al. | 359/387 |
| 4,806,004 | 2/1989 | Wayland | 359/389 |
| 4,812,029 | 3/1989 | Onanhian | 359/385 |
| 5,249,077 | 9/1993 | Laronga et al. | 359/390 |
| 5,296,963 | 3/1994 | Murakami et al. | 359/389 |
| 5,345,333 | 9/1994 | Greenburg | 359/389 |

FOREIGN PATENT DOCUMENTS

| | | | |
|---|---|---|---|
| 2316943 | 9/1974 | Germany | 359/390 |
| 1203625 | 8/1970 | United Kingdom | 359/388 |

*Primary Examiner*—Thong Nguyen
*Attorney, Agent, or Firm*—H. Michael Brucker

[57] ABSTRACT

An illumination system increasing resolution, sharpness, depth of field, and real time 3D perception of depth for a transmitted light microscope including an objective lens having an optical axis, wherein a plurality of separate light beams passing through a specimen to the objective lens along paths that are oblique to the optical axis of the objective lens. Fiber optic light guides can be used to initiate a light beams that follow the above described paths.

34 Claims, 6 Drawing Sheets

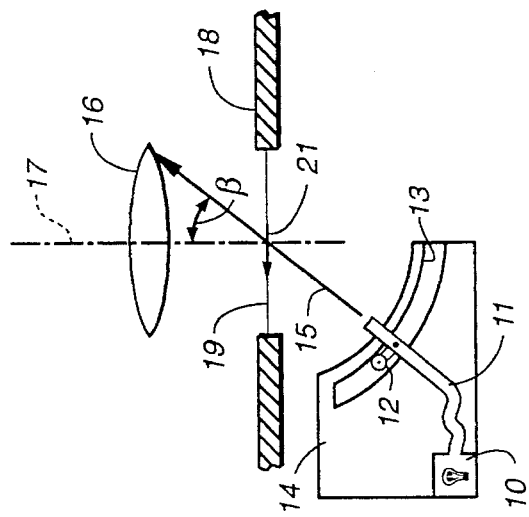
FIG._1C
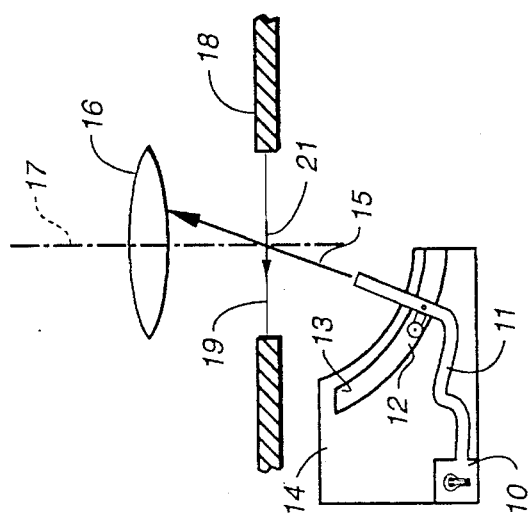
FIG._1B
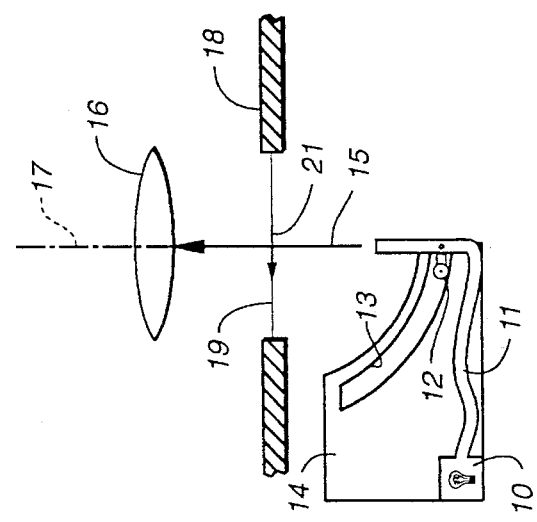
FIG._1A

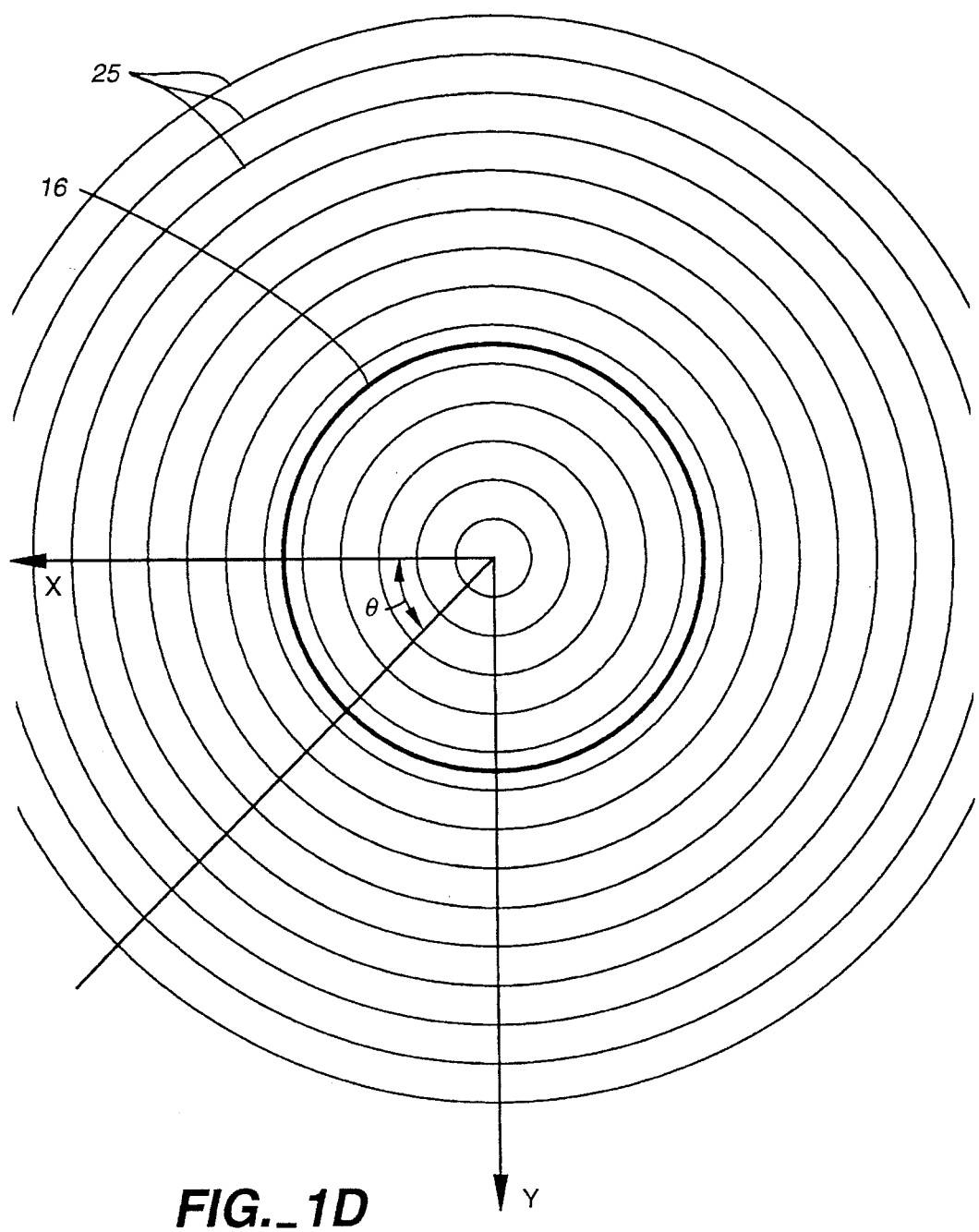
FIG._1D

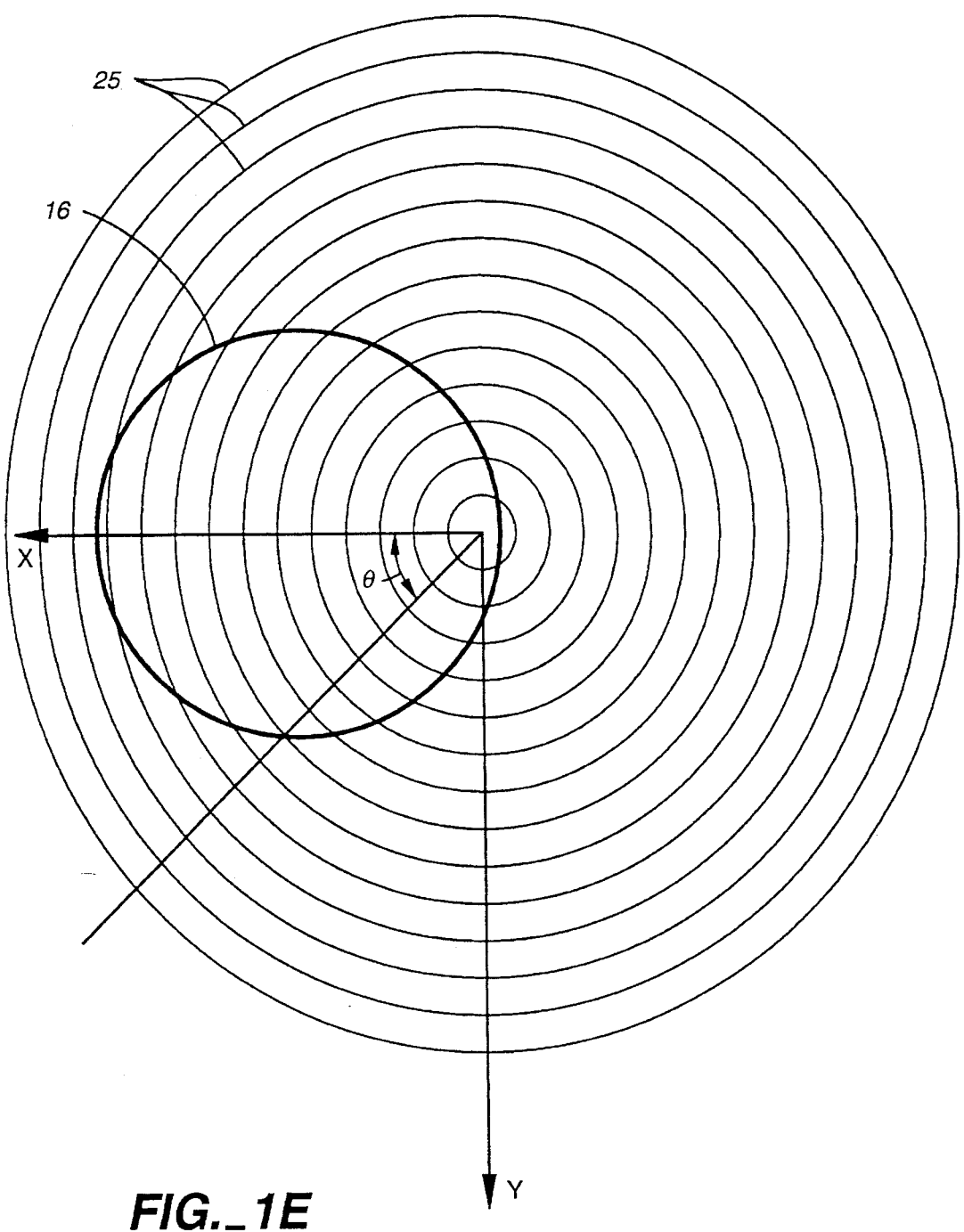
FIG._1E

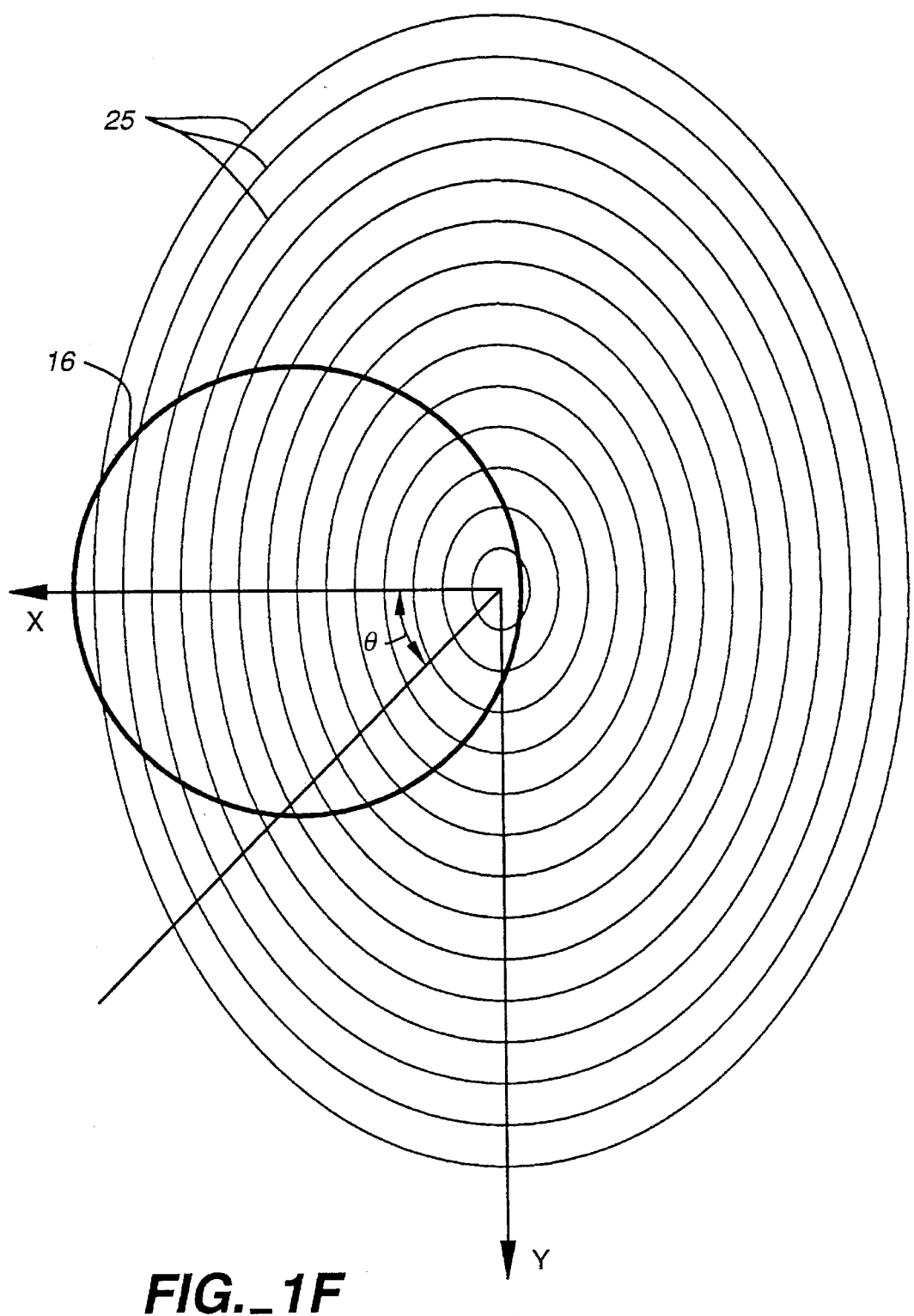
FIG._1F

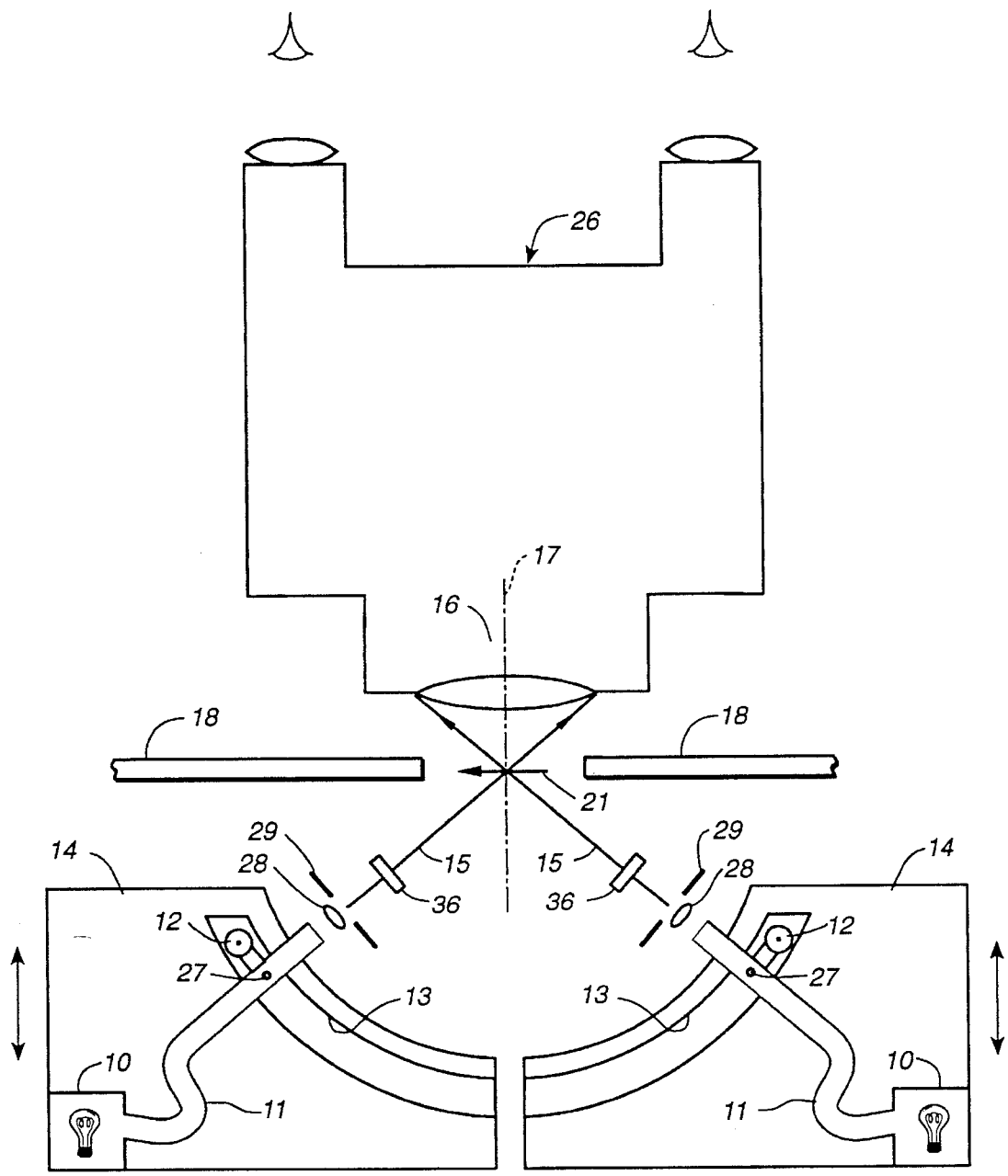
FIG._2

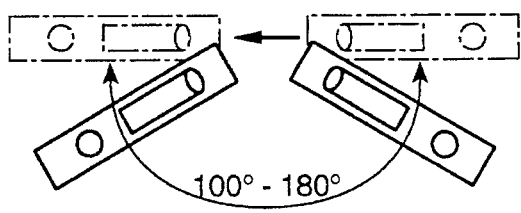
FIG._ 2A
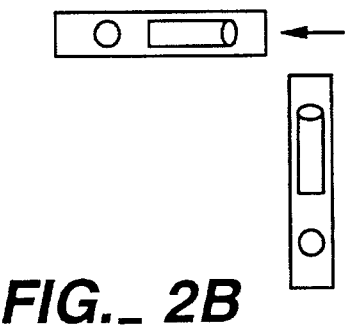
FIG._ 2B
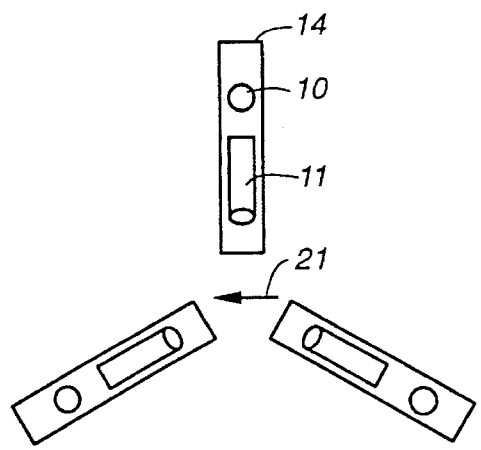
FIG._ 2C
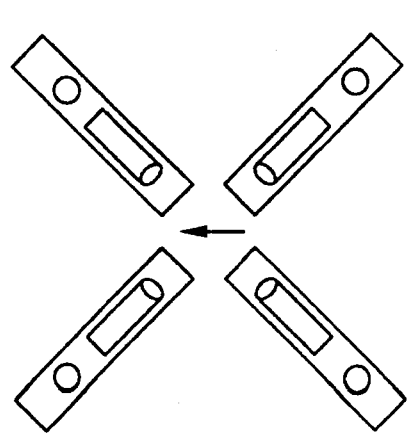
FIG._ 2D
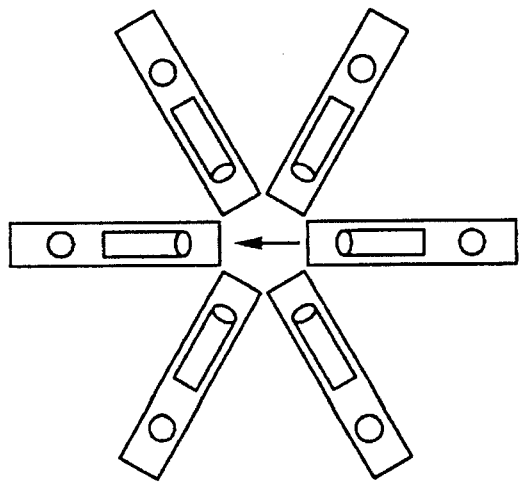
FIG._ 2E

FIBER OPTIC ILLUMINATION SYSTEM AND METHOD FOR A HIGH DEFINITION LIGHT MICROSCOPE

This application is a continuation-in-part of my application Ser. No. 07/688,170 filed Apr. 19, 1991, now U.S. Pat. No. 5,345,333.

BACKGROUND OF THE INVENTION

1. Field of the Invention

This invention relates to illumination systems for transmitted light microscopes that utilize two or more illuminating light beams whose axis are at an oblique angle relative to the optical axis of a microscope objective lens.

2. The Prior Art

The use with microscopes of what is commonly refereed to "oblique light" was of interest towards the end of the last century and the beginning of this, but the many devices designed for that purpose, although ingenious in some cases, have failed to survive. See *The Intelligent Use of the Microscope,* Oliver, C. W., Chemical Publishing Co., 1953.

Oliver limits his meaning of "oblique light" to the "use of a narrow cone or beam of rays directed upon the object from any direction other than the optical axis provided that it enters the object glass." same reference as above at 94. In this way he excludes from his discussion those systems that use rays directed onto a specimen from a direction other than the optical axis but which do not enter the object glass as well as systems where the light does not enter the objective lens at an angle (such as systems that merely tilt the specimen stage). Illumination provided by systems in which the primary beam does not enter the objective is generally known and commonly referred to as "dark field" illumination as more fully discussed in Photomicrography a Comprehensive Treatise, Loveland, R. P., John Weily & Sons, Chapter 12. Although the present invention utilizes true oblique lighting as that term is used by Oliver, and is thereby clearly distinguishable from "dark field" systems, a brief description of "bright field" and "dark field" illumination will help to differentiate and more fully highlight the attributes of the present invention.

Illumination systems that direct rays onto a specimen along the optical axis create "bright field" illumination, so named because the rays passing through the field surrounding the specimen and entering the microscope objective lens are unimpeded and thus bright compared to the rays attenuated by passing through the specimen. In a "dark field" system, the relative brightness is reversed by directing only light rays onto the specimen field which are angled relative to the optical axis and directed to fall outside the objective aperture. All of the light passing through the specimen field surrounding the specimen is unimpeded and thus does not enter and is therefore not "seen" by the objective lens. Some of the light directed onto the specimen will be scattered, however, into secondary light rays, some of which will enter the objective lens (and be "seen"). Thus, the object appears brighter than the surrounding dark field. Such a system is described in U.S. Pat. No. 4,896,966.

The prior art contains a number of systems that combine "bright field" and "dark field" illumination for use both together and selectively, as illustrated in U. K. Pat. No. 887,230, and U.S. Pat. No. 4,601,551. In all of these systems the primary illuminating light is either aligned with the optical axis or angled to fall outside of the objective aperture.

The invention of U.S. Pat. No. 3,876,283, teaches the use of a system which uses true oblique lighting, by use of a prism located on the optical axis of a microscope condenser to laterally off-set an axial illumination beam to a path separate from the optical axis so as to direct the beam onto an off center location on the condenser lens. When a light beam parallel to the optical axis enters an off center location on a condenser lens, the beam will exit the lens at an angle to the optical axis. The degree of the angle is a function of the displacement of the beam from the center of the lens. When, as in patent '283, the angle is within the objective aperture, the system produces true oblique lighting as defined by Oliver (the light is "seen" by the objective). In order to achieve the maximum oblique angle for the beam it must exit the condenser lens at or very near its periphery at an angle that is just within the objective aperture. While the teachings of patent '283 make this possible (by adding a wedge shaped prism to the plano prism shown), each different condenser and objective combination will require a different pair of prisms to achieve a maximum angle. Otherwise, depending on the characteristics of the objective lens and condenser lens being used, it may be necessary with the system of patent '283to direct the laterally off-set beam onto the condenser lens at a location inwardly of its periphery in order to have the resultant exit angle within the objective aperture. In such cases the maximum possible oblique angle will not be realized and, as will be explained below, the maximum resolution power of the system will not be achieved.

In patent '283. the location of the illuminating beam (between 15 and 17) and beam path shifting means 23 (prism) on the optical axis limits the system by permitting the use of only a single illumination beam.

The references cited above are typical of the prior art in that they fail to recognize the real potential of oblique lighting to enhance resolution. Patent '283, in fact, does not acknowledge the resolution enhancing potential of oblique light but instead cites as a reason for its use the casting of shadows to highlight uneven areas of the specimen. It is not, therefore, necessarily an object or desideratum of patent '283 to provide a maximum oblique angle (for example, too much shadowing might obscure details). But, one of the requirements of realizing the full potential of oblique lighting to dramatically enhance resolution is that the angle of the oblique light be maximized. Maximum resolution is achieved for a given objective lens by having the illumination beam at a maximum oblique angle and still within the objective aperture. By making it possible to adjust the angle at which the beam passes through the specimen, resolution can be fully maximized.

The present invention teaches that the essential requirement for realizing the maximum potential of true oblique lighting is the ability to direct two or more separate and distinct specimen-illuminating light beams at the maximum angle to the objective axis that permits the illumination to enter the objective. This, of physical necessity, requires that the beam Shifting means be located off the optical axis of the objective. In addition, the present invention overcomes the anistropy that is found in prior art oblique illuminating systems.

In addition,the present invention teaches a real time, 3-D system using multiple beams which goes far beyond what can be achieved with a single beam, such as that described in U.S. Pat. No. 4,072,967. Patent '967 teaches how to achieve a 3-D image using a microscope with a single condenser lens and a single objective lens by placing complimentary filters across the left and right halves of the condenser lens and placing a complementary filter set in the binocular eyepieces. With this type of system the degree of parallax is fixed. Futhermore, there is very little disparity in parallax between the left and right images, especially at the center of the image field. In contrast, with the present invention the left and right images are independently controlled and the degree of parallax between them can be easily adjusted to match the type of objective being employed and the type of specimen being viewed. In addition, there is another and possibly even more important advantage with the present invention, which is the ability to achieve a greater depth of field without loss of resolution, as is more fully explained below. This is a critical prerequisite for producing a sharp 3-D image.

SUMMARY OF THE INVENTION

The present invention resides in an illumination means for a transmitted light microscope characterized by light beams at oblique angles to the optical as of an objective lens means (which is comprised of several lenses). The object or specimen to be illuminated is located between the illumination means and the objective lens means.

The diffraction theory of microscopic vision teaches that when examining with transmitted light an object having very closely spaced structural details such as the markings of the diatom Amphipleura pellucida. The resolution and sharpness of the tiny lines in the image depend upon the number of orders of diffraction wavelets that are collected by the objective lens and used to form the image. The number and arrangement of the diffraction orders depend upon the lines in the object and the wavelength of light being used and other factors. The finer the detail on the object, the greater the angular separation between the orders.

The more successive orders of wavelets recombined with the central beam the more the resolution and sharpness of the image increases.

Using an axial illuminating beam on an object such as the diatom Amphipleura pellucida, creates diffraction orders over such a large angle that even the highest numerical aperture objectives available cannot include all of them. The specimen's markings remain unresolved and thus invisible.

The use of oblique lighting can result in the inclusion of one or more orders of wavelets for a specimen which are lost when illuminated by axial lighting. The greater the angle of the oblique light the greater the number of orders of wavelets included within the objective aperture and thus the greater the resolving power of the system. In fact, both the resolution as well as the sharpness of the image can be significantly increased compared to axial illumination, because the optimal oblique illumination will place the zero order wavelet near the edge of the objective aperture and thus, the objective can recombine more orders of diffraction wavelets for any given structural detail.

Accordingly, it is a principal object of the present invention to provide an illumination system and method for a transmitted light microscope which produces light beam paths to the objective which are oblique to the objective's optical axis to enhance a microscope's resolving power and sharpness of image.

In conjunction with the object stated above, it is an object of the invention to utilize the entirety of the beam or beams directed onto the specimen. That is to say, that the present invention, unlike so much of the prior art, does not use a mask on a condenser lens, or between a condenser lens and the specimen, to create an oblique light beam from a small portion of the beam initially directed onto the condenser.

It is a further object of the invention to provide for a transmitted light microscope an illumination system which produce oblique light beams which are independently selectively adjustable in both their location and angle relative to a specimen and the optical axis of the objective lens.

While the use of a single illuminating beam according to the present invention achieves results which can surpass the prior art in terms of resolution, and is within the scope of the invention, the maximum potential of oblique lighting is achieved in the present invention when a plurality of independent beams are used. Specifically, while a single beam system produces enhanced resolution, it does so predominantly along the direction of the beam axis (projected onto the specimen plane). Furthermore, at 90 degrees to that axis there is a significant decrease in resolution and sharpness. For example, in order to see the detailed pattern of *Amphipleura pellucida* the specimen must be rotated on the stage so that the markings are oriented along the axis of the oblique illuminating beam. As the specimen is rotated away from that optimal position, the markings become less distinct and finally disappear altogether. As the specimen is rotated further, the markings become visible again as the orientation approaches 180 degrees. This is a result of the fact that while a single oblique beam increases resolution along an X dimension, it decreases resolution along the perpendicular Y dimension. If, however, two oblique beams illuminate a specimen so that their angle of orientation is 90 degrees apart, then the image resolution and sharpness is increased in both the X and Y dimensions. Enhanced resolution over essentially the entire specimen plane is achieved using multiple oblique illuminating beams radially spaced about the optical axis of the objective. As a result, very fine structural details such as the markings on *Amphipleura pellucida* can be seen regardless of how the specimen is oriented on the stage.

When multiple beams are used, enhanced resolution is derived not only from the benefits of oblique illumination but also from the overall increase in the system's N.A. (numerical aperture) that results from multiple beams following different oblique paths from the specimen to the objective.

Thus, another object of the invention is to provide an illumination system and method for a transmitted light microscope utilizing a plurality of independent, separate illuminating light beams directed onto a specimen wherein each light beam follows a different oblique angled path to the objective (relative to the objective's optical axis).

Another object of the invention is to provide an illumination system for a transmitted light microscope utilizing a plurality of independent separate illuminating beams from a plurality of fiber optic light guides directed at a specimen wherein the path of each light beam from the specimen is independently adjustable in both its location and angle. Such a system enjoys, in addition to the advantages already stated, the additional advantage of being able to significantly increase the depth of field without degradation of resolution.

Other objects of the present invention will in part be obvious and will in part appear hereafter.

A significant part of the present invention teaches how to realize the maximum potential of oblique illumination by directing two or more separate and distinct oblique light beams onto a specimen in a variety of configurations in order to achieve results which would not be possible with a single illuminating beam. Some of those configurations will be illustrated and their advantages discussed. However, there are other possible configurations that will not be specifically discussed but still fall within the scope of these teachings.

BRIEF DESCRIPTION OF THE DRAWINGS

The foregoing and other objects, aspects and advantages of the invention will be better understood from the following detailed description of the preferred embodiment of the invention with reference to the drawings in which:

FIG. 1A is a schematic diagram of microscope optical elements (including a fiber optic light guide and an objective lens) wherein the illumination path is coincident with the axes of the objective lens;

Figure 1B is a schematic diagram of the microscope optical elements of FIG. 1A wherein the illumination path is oblique to the objective lens;

FIG. 1C is a schematic diagram of the microscope optical elements of FIG. 1A wherein the illumination path is more oblique to the axes of the objective lens;

FIG. 1D is a wave diagram illustrating the relative number of orders of wavelets that can be seen by the objective lens by the illumination arrangement of FIG. 1A;

FIG. 1E is a wave diagram illustrating the relative number of orders of wavelets that can be seen by the objective lens by the illumination arrangement of Figure 1B;

FIG. 1F is a wave diagram illustrating the relative number of orders of wavelets that can be seen by the objective lens by the illumination arrangement of FIG. 1C;

FIG. 2 is an optical schematic illustration of a two beam embodiment of the invention; and FIGS. 2A–2E are schematic plan views illustrating five possible multiple light guide arrangements.

DESCRIPTION OF PREFERRED EMBODIMENTS

An important aspect of the present invention is best described with reference to FIGS. 1A–1C. A light beam source 10 sends light through a fiber optic light beam guide 11 which is mounted on a trolley 12 which travels in a track 13 of a light source transport means (frame) 14. The beam 15 from guide 11 is directed onto a specimen 21 through which it is transmitted into an objective lens means 16 having an optical axis 17. A specimen support stage 18 disposed between the light guide 11 and the objective 16 defines a specimen plane 19, in which the specimen 21 is located. Although the objective 16 is shown diagrammatically as a single lens, it will be understood by those skilled in the art that the objective means 16 may be comprised of multiple elements.

Unless otherwise stated, lines indicated as representing a beam path such as 15, are schematic representations of a beam's axis. In reality, of course, a beam has an envelope which can be converging, diverging or parallel. An understanding of the present invention is best facilitated, however, by following the path of a beam's axis.

For the arrangement of FIG. 1A, the beam path 15 passes through the specimen plane 19 at right angles thereto and includes the objective lens 16 along its axis 17. FIG. 1A represents a "bright field" illumination system.

Referring to FIG. 1B, guide 11 is connected to the trolley 12 to be radially aligned relative to track 13. When frame 14, which is moveable along a direction perpendicular to the specimen plane 19, is positioned to put the specimen 21 at the center of a circle of which track 13 is an arc, the beam 15 will pass through the specimen regardless of the position of the trolley 12 in the track 13. Changing the position of the trolley 12 along track 13 varies the angle of the beam 15 through the specimen relative to the optical axis 17 of the objective lens 16. At a given location of the trolley and guide on the track 13, the beam 15 will be at the maximum angle to the optical axis 17 of the objective 16 at which it still enters the objective 16.

Referring to FIG. 1B, when the trolley 12 is positioned away from the axial position shown in FIG. 1A, the path of beam 15 becomes oblique (at an angle β) to the optical axis 17. As shown in FIG. 1C, at a particular position on the track 13, the path of beam 15 is at the maximum angle β through the specimen that includes the objective lens 16.

Since the specimen plane 19 is at right angle to the objective axis 17 the beam path 15 will be angled or oblique to a specimen in the specimen plane 19. For the purposes of the present invention, however, the important relationship is the angle β between the beam path 15 and the optical axis 17 of the objective 16. The advantages of the present invention do not, for example, accrue from a system that creates an oblique angle between the specimen plane and the illuminating beam path by tilting the specimen stage while at the same time allowing the illuminating beam to travel a path that is parallel to the objective axis. Such an arrangement still produces standard "bright field" illumination enhanced only by some possible shadowing.

While the single beam system described above is capable of greatly enhancing a microscope's resolution, the improved resolution is primarily along the direction of the axis of the illuminating beam (as projected onto the specimen plane), with the resolution along a direction 90 degrees thereto being significantly degraded.

Resolution and sharpness are ultimately dependent upon the number of orders of diffraction wavelets that can be collected and recombined by the objective lens. FIGS. 1D, 1E and 1F illustrate the relative number of orders of wavelets that can be seen by the objective lens under the illuminating conditions shown in FIGS. 1A, 1B and 1C, respectively. In FIG. 1E, which corresponds to the oblique illuminating conditions of Fig. 1B, the objective lens collects and recombines more orders of diffraction wavelets 25 than shown in FIG. 1D which corresponds to the axial illuminating system of FIG. 1A. However, the increase in the order of wavelets collected in the X dimension is linked to a decrease in the order of wavelets collected in the Y dimension. This increase (or decrease) in resolution relative to the resolution attainable with axial illumination, is proportional to 2 times the cosine of angle Ø, where angle Ø is the angle of orientation of the specimen 21 relative to the axis of the oblique illumination. Angle Ø ranges from 0 to 90 degrees, where 0 degrees is the X dimension (or the axis of oblique illumination) and 90 degrees is the Y dimension.

In FIG. 1F, which corresponds to the maximum oblique illuminating conditions, as shown in FIG. 1C, the number of diffraction wavelets 25 collected and recombined by the objective is even greater than the number attainable with the oblique illuminating conditions shown by FIG. 1B and 1E. This results from the fact that the objective lens is viewing the wave front at such a highly oblique angle that the spacing of the wavelets appears foreshortened and so more wavelets can be seen by the objective. This additional increase in resolution is proportional to the sine of the angle between the axis of the oblique illuminating beam and the optical axis 17 of the objective lens means 16.

One of the outstanding features of the present invention is that the illumination means (i.e. guide 11) is located off the optical axis 17 thereby permitting a plurality of guides 11 to operate within the system simultaneously. Thus, improved resolution over the entire specimen plane can be achieved by utilizing a plurality of illuminating fiber optic guides 11 positioned to have their respective axes at selected angles to one another.

Referring to FIG. 2, a plurality of specimen illuminating beam source means in the form of light sources 10 and fiber optic guides 11 disposed off the optical axis 17 of objective 16 permit the system to operate with independent illuminating beams to the objective 16. The fiber optic light guides 11 (two in this embodiment) direct light beams 15 along paths that pass through specimen 21, and objective lens 16 to create an image of the specimen that can be viewed at eyepiece 26. Each light guide 11 is mounted on a trolley 12 which travels in a track 13 formed in a light guide frame 14. The guides 11 are attached to the trollies 12 about a pivot point 27 which permits the angle of the guide relative to the frame 14 to be adjusted. Each frame 14 is mounted for relative movement in a direction generally perpendicular to the specimen plane 19 (parallel to the optical axis of the objective).

By positioning frame 14 along its path, the working distance between the specimen 21 and the light guide 11 can be increased or decreased. At a particular position of frame 14, the arc of the track 13 is a section of a circle with its center generally at the specimen 21. The guides can be positioned on their trollies 12 to direct their beams 15 radially, relative to the are of the track 13. When this is the case, movement of a trolley 12 in its track 13 causes the angle of the path of the light beam 15, relative to the optical axis 17 of the objective lens 16, to vary while still passing through the specimen 21. When the frame 14 is at a position other than that which locates the track are center at the specimen, movement of the guides about their pivot points 27 is necessary along with trolley 12 movement along track 13 to keep the specimen illuminated. Thus, the combination of the three degrees of movement of light guides 11 (along track 13; about pivot point 27; and, with frame 14—toward and away from the specimen 21) permits maximum oblique angle illumination to be achieved.

By arranging a plurality of light guide carrying frames 14 like the spokes of a wheel, with the specimen 21 at the center, embodiments of the invention having multiple beams is readily achieved, as illustrated in FIGS. 2A–2E. The relationship of the locations of guides 11 (frames 14) relative to optical axis 17 of objective 16 can be different depending on the results desired. For example, the guides can be disposed in opposing relationship (100–180 degrees apart) for 3-D viewing purposes, as shown in FIG. 2A, or at essentially right angles (90 degrees apart) as shown in FIG. 2B, to achieve the best overall resolution for a two beam system.

Resolution over the entire specimen plane is improved by increasing the number of beams. A three beam system as shown in FIG. 2C, where the frames 14 are evenly angularly spaced (120 degrees apart) about axis 17, provides improved resolution over the entire specimen plane, as does the four beam arrangement of FIG. 2D. These four beams can also be used as two two-beam pairs for improved 3-D viewing. Increasing the number of beams even further to as many as six as shown in FIG. 2E will produce even better overall resolution for either 2-D or 3-D viewing. Because of the off axis placement of the flames 14, numerous other arrangements of guides 11 are possible to meet specific needs.

A lens 28 can be disposed between the light guide 11 and the objective 16 where desired, as can iris stop 29 (FIG. 2). They will move with the guide 11 as they are positioned to remain in the same location relative to the guide regardless of the position of the guide 11 relative to the specimen 21.

One of the outstanding features of the multiple beam embodiment of the present invention is the intensity of light available to illuminate the specimen at the specimen plane 19. Unlike prior art devices that create angled light beams, the present invention does not require the use of masks or other light occluding devices. Thus, in the present invention virtually all of the light from the light beam source means is available for illumination of the specimen. While the light beam source means has been shown schematically as a light bulb, it will be understood by those skilled in the art that the light beam source means may include any suitable source of radiation as well as lens means and other optical devices well known for the purpose of furnishing object illuminating light.

Another important feature of the multiple beam embodiment is that it is able to overcome the anistropy that is inherent in all oblique illuminating systems known in the prior art. The anistropy of resolution and sharpness has been discussed above. Another effect of the anistropy associated with prior art systems is the obvious uneven illumination of the image field. That is, one side of the field of view appears bright while the opposite side appears dark. The introduction in the present invention of multiple beams makes it possible to produce an evenly illuminated field of view.

The utilization in the present invention of a plurality of light beams following different paths to the objective makes it possible to individually manipulate those beams for a variety of possible results in addition to enhanced resolution. For example, referring to FIG. 2, real time 3-D is achieved by interposing complimentary polarizing filters 36 and 37 in beam paths 15 together with providing similar eye piece polarizing filters 38 and 39 in binocular eye piece 26 having a pair of viewing lenses 42 and 43. The filters 36 and 37 are denoted by positive and negative symbols to indicate that they could be complementary in a variety of different ways known in the art. They may be plane polarizers oriented with their polarizing axes mutually at right angles. Alternatively, they may be circular polarizers, one of the pair producing left-hand polarization, the other producing right-hand polarization. Yet in another alternative, the filters may be complementary color filters (such as red and green) of either the absorption or dichroic type. The eye piece filters 38 and 39 interact with filters 36 and 37 to selectively limit the light from only one of the light guides 11 so that the image produced by the light along one beam path 15 does not exit the viewing lens 43, and the image produced by the light along the other beam path 15 does not exit the viewing lens 42.

The overlap of the filtered beams which is possible by adjustment of the locations of guides 11 creates real 3-D images and by being able to independently control the direction of the light paths of the beams, it becomes possible to control the parallax angles for left and right images, and thereby control the degree of depth perception in the final image.

An evenly spaced four beam system FIG. 2D in which one pair of adjacent beams provides the illumination for one eyepiece and the other pair of adjacent beams provides the illumination for the other eyepiece, provides the advantage of overall high resolution inuring to a system of two beams at right angles, with 3-D viewing.

The present invention goes far beyond what can be achieved with a single beam, real time, 3-D system in which the degree of parallax is fixed, and there is very little disparity in parallax between the left and right images, especially at the center of the image field. In contrast, with the present invention the left and right images are independently controlled and the degree of parallax between them can be easily adjusted to match the type of objective being employed and the type of specimen being viewed. In addition, there is another and possibly even more important advantage with the present invention, which is the ability to achieve a greater depth of field without loss of resolution. This is a critical prerequisite for producing a sharp 3-D image.

A microscope utilizing the illumination system of the present invention can use any of the many light beam manipulation devices known in microscopy, such as polarizing filters, aperture stops, phase contrast annuli, collimator, etc. In multiple beam systems of the present invention these devices can be used to provide beams having different characteristics or those having the same characteristics.

Since resolution is enhanced by oblique illumination primarily along the axis (in both directions) of the illuminating light beam, while being diminished along the axis 90 degrees thereto, a first order approximation of high resolution over the entire specimen plane is achieved using two beams. Adding more beams will further enhance the distribution of high resolution over the specimen plane. However, little is gained by using more than 5 or six oblique light beams, spaced about the optical axis. As can be seen from the previous discussion about the anistropy of resolution associated with a single oblique beam (FIGS. 1E and 1F), the fall-off in resolution is negligible within 15 degrees or so either side of the axis of each illuminating beam (it is proportional to the cosine of that angle).

From the forgoing it is apparent that in order to achieve enhanced resolution the present invention does not limit the use of well known optical devices for light manipulation nor does it result in operation at low light levels relative to the light provided by the light source means. Thus, the illumination system of the present invention enhances resolution and at the same time makes it possible to create illumination conditions that can satisfy a wide variety of investigation needs.

A multi-beam system of the present invention enjoys enhanced resolution both from an increase in the oblique orientation of the illuminating beams relative to the objective lens means optical axis (increase in orders of wavelets recombined) as well as from an increase in the overall aperture of illumination due to the additive effect of the multiple light beams that are directed onto the objective from around its periphery.

The present invention is independent of any particular mechanical or electrical system for positioning and directing the illuminating beams. This includes systems that may be adjustable or pre-adjusted and fixed, and may utilize mirrors, prisms, fiber optics or other known or unknown devices. Such mechanical systems can take any number of forms known to those skilled in the art.

Where it is desired to be able to vary one beam path without disturbing the others, then the positioning of the trollies is most advantageously mechanically independent. In the preferred embodiment of the invention the trollies are selectively mechanically inter-connected for unified movement and mechanically unconnected for independent movement. Such a system is capable of satisfying the needs of a wide variety of microscope uses.

The method of the present invention for increasing resolution, sharpness and depth of field in a transmitted light microscope having a an objective lens means with an optical axis, which is apparent from the forgoing, constitutes the steps of directing a plurality of independent light beams through a specimen into the objective lens means along paths that are not coincident with the objective lens means optical axis; and fixing the location and direction of the paths of the light beams to the objective lens means so that the light beams are oblique relative the optical axis of the objective lens means, yet still include the objective lens aperture.

When the number of beams is two and they are directed along paths that are in opposition to one another (100–180 degrees apart) they provide illumination for real-time 3-D viewing. When they are at right angles (90 degrees to one another) they provide the best overall resolution using just two beams. When the number of beams is three or more they are preferably radially positioned and spaced about the optical axis of the objective lens means for the best overall resolution at the specimen plane.

The invention is susceptible to a number of variations and equivalents that are within the teachings of the invention such that the invention is not limited to the precise embodiments illustrated and described.

The invention having been fully described, it is not to be limited to the details herein set forth, but is of the full scope of the appended claims.

What is claimed is:

1. In a specimen illumination system for a transmitted light microscope having an objective lens having an optical axis, the improvement comprising:

light beam source means for providing a plurality of independent light beans that pass through a specimen and travel to the objective lens along paths that are oblique to the optical axis of the objective lens and wherein the light beam paths between said light beam source means and the objective lens do not pass through a common condenser lens.

2. The invention of claim 1 wherein the number of independent light beams is two.

3. The invention of claim 1 wherein the number of independent light beams is three.

4. The invention of claim 1 wherein the number of independent light beams is four.

5. The invention of claim 1 wherein the number of independent light beams is six.

6. The invention of claim 1 further comprising:

transport means for said light beam source means movable in space for adjusting the position in space of the light beams.

7. The invention of claim 6 wherein:

said transport means is operable to vary the angle of each of the light beams relative to the optical axis of the objective lens.

8. The invention of claim 7 wherein:

said light beam source means includes a plurality of fiber optic light guides.

9. The invention of claim 6 wherein:

said transport means is movable in space to vary the distance between said light beam source means and the specimen.

10. The invention of claim 9 wherein:

said light beam source means includes a plurality of fiber optic light guides.

11. The invention of claim 6 wherein:

said light beam source means includes a plurality of fiber optic light guides.

12. The invention of claim 1 wherein:

said light beam source means includes a plurality of fiber optic light guides.

13. The invention of claim 12 wherein the number of fiber optic light guides is two.

14. The invention of claim 12 wherein the number of fiber optic light guides is three.

15. The invention of claim 12 wherein the number of fiber optic light guides is four.

16. The invention of claim 12 wherein the number of fiber optic light guides is six.

17. The invention of claim 12 wherein said transport means comprises:

an optical fiber light guide frame including a track; and an optical fiber light guide trolley carrying one of said fiber optic light guides and movable along said mounting frame track.

18. The invention of claim 17 wherein:

said track is arcuate and movement of said trolley along said track varies the angle of the light from the light guide carried by said trolley relative to the objective lens optical axis.

19. The invention of claim 18 wherein said trolley in addition to moving along said track, is also gimbled to vary the angle of the light guide relative to said trolley.

20. The invention of claim 17 wherein said mounting frame is moveable toward and away from the specimen.

21. The invention of claim 12 further comprising:

individual lens means between each said light guides and the specimen.

22. The invention of claim 12 further comprising:

iris means between said light guides and the specimen.

23. The invention of claim 1 wherein each independent light beam passes through a separate independent lens prior to passing through the specimen.

24. A method of increasing resolution of a specimen image in a transmitted light microscope having an objective lens with an optical axis, comprising the steps of:

directing a plurality of independent light beams through a specimen without first passing them through a common condenser:

directing the light beams that pass through the specimen to follow paths that pass through the objective lens and are oblique to the optical axis of the objective lens.

25. The method of claim 24 wherein the number of beams is more than two and they are positioned circumferentially about the optical axis of the objective lens.

26. The invention of claim 24 including two beams that are between 90 and 180 degrees apart about the optical axis of the objective lens.

27. In an illumination system for a transmitted light microscope useful for viewing a specimen within a field of view and including an objective lens having an optical axis, the improvement comprising:

a light beam source means for providing a plurality of independent light beams each of which independently illuminates the field of view and overlaps with at least one other independent light beam at the field of view and travels to the field of view along a path that is oblique to the optical axis of the objective lens and travels to the objective lens along a path that is oblique to the optical axis of the objective lens.

28. The system of claim 27 wherein:

said light beam source means includes a plurality of fiber optic light guides.

29. The system of claim 28 further comprising:

transport means supporting said light guides and movable in space together with said light guides.

30. The system of claim 22 wherein said transport means comprises:

an optical fiber light guide frame including a track; and an optical fiber light guide trolley carrying one of said optical fiber guides and movable along said frame track.

31. The system of claim 28 further comprising:

individual lens means between each of said light guides and the field of view.

32. A method of illuminating a specimen in a field of view in a transmitted light microscope having an objective lens with an optical axis, comprising the steps of:

illuminating the field of view with a plurality of light beams each of which independently illuminates the field of view and overlaps with at least one other independent light beach at the field of view; and directing each independent light beam to the field of view along a path oblique to the optical axis of the objective lens and from the field of view to the objective lens along a path that is oblique to the optical axis of the objective lens.

33. The method of claim 32 wherein the number of independent light beams is more than two and they are positioned circumferentially about the optical axis of the objective lens.

34. The method of claim 33 wherein said independent light beams are directed along light guides.

* * * * *

UNITED STATES PATENT AND TRADEMARK OFFICE
CERTIFICATE OF CORRECTION

PATENT NO. : 5,570,228
DATED : October 29, 1996
INVENTOR(S) : Gary Greenberg

It is certified that error appears in the above-indentified patent and that said Letters Patent is hereby corrected as shown below:

```
Column 3, line 21, the word "as" should read -- axis --.
Column 7, line 31, the word "are" should read -- arc --.
Column 7, line 66, the word "flames" should read -- frames --.

Column 12, line 22, Claim 30 should read -- The system
    of claim 29 . . . --.
```

Signed and Sealed this

Tenth Day of June, 1997

*Attest:*

BRUCE LEHMAN

*Attesting Officer*     Commissioner of Patents and Trademarks